Patented June 12, 1934

1,962,327

UNITED STATES PATENT OFFICE 1,962,327

PROCESS OF STABILIZING CELLULOSE NITRATE

Marvin J. Reid, Rochester, N. Y., assignor to Eastman Kodak Company, Rochester, N. Y., a corporation of New York No Drawing. Application October 4, 1932, Serial No. 636,174

10 Claims. (Cl. 18—51)

This invention relates to the stabilizing of clear cellulose nitrate film base or sheeting.

Much clear cellulose nitrate sheeting is used in the photographic industry for the purpose of photographic film and is worth sufficient to warrant its reuse for some purposes. However, in storing such film scrap awaiting its reuse, or possibly due to the process by which it may have been manufactured, it may become more or less unstable. I have found that such cellulose nitrate sheeting may be successfully stabilized by treating it with an alcoholic caustic solution.

In the manufacture of cellulose nitrate, greater or less amounts of compounds other than pure cellulose nitrate are unavoidably formed—the amount thereof being dependent upon the efficiency of the process. Despite careful washing, the last traces of mineral acids are sometimes difficult to remove. The presence of these compounds may, under conditions of oxidation, increased temperature or the like, influence or catalyze the breaking down of the cellulose nitrate. My stabilization treatment neutralizes any mineral acid present and breaks down these unstable compounds into a form easily removable by washing in the ordinary way. Proof of stability is the German heat test by which the cellulose nitrate is subjected to a temperature of 135° C. for 23 minutes. If there is no evidence of decomposition, namely, if litmus placed in the container does not turn red and if no nitric oxide fumes are given off, the cellulose nitrate is regarded as stable.

It is, accordingly, among the objects of my invention to provide a process for stabilizing cellulose nitrate sheeting.

If the sheeting to be recovered consists of photographic film, the silver-halide emulsion is first removed from the film by soaking it in hot water whereupon the emulsion readily drops off from the film. This cellulose nitrate sheeting, or any other cellulose nitrate sheeting which it is desired to stabilize, may then be immersed in an ethyl alcohol solution containing from .1% to 1% of caustic alkali such as a .75% solution of sodium hydroxide. It is better, of course, for the sheeting to be cut up into small pieces, a fraction of an inch square in size, although this is not essential. This treatment is continued for approximately thirty minutes at a temperature of from 115° to 120° F. more or less, although this temperature may be varied several degrees either way as hereinafter related, following which the cellulose nitrate sheeting may be leached in hot water or in a couple of changes of ethyl alcohol at approximately 115° F. for about thirty minutes each. The cellulose nitrate sheeting will then be found to be very well stabilized.

The alcohol for making the caustic solution need not be absolute alcohol as 75 to 80%, or other similar strengths of aqueous ethyl alcohol may be employed. The amount of caustic alkali to be used depends upon the degree or rate of stabilization desired. A .1% to .2% alcoholic solution of sodium hydroxide will give some stabilization but does not as completely stabilize as does the .75% solution above referred to as preferred, or even a stronger solution. Either sodium or potassium hydroxide may be employed as the caustic, or similar well known caustic alkali may likewise be used. Too high a temperature should be avoided because of degradation or decomposition of the nitrate. Too low a temperature is not desirable because it slows up or even inhibits the stabilizing action of the solution. Other variations are to be included, as will be apparent to those skilled in the art, the invention being limited only by the claims appended hereto.

Furthermore, my invention is not to be confused with decolorizing, bleaching or viscosity reduction. While one or more of those things may occur along with my stabilization treatment, I am the first so far as I have been able to ascertain, to employ this novel method for the stabilization of cellulose nitrate sheeting without regard to color, viscosity, etc. In fact, my process is distinguished from previous processes in that I employ a weaker solution of alkali than would be of any effect in a decolorizing process, or viscosity reducing process, but which solution is very effective in stabilizing the cellulose nitrate.

What I claim and desire to secure by Letters Patent in the United States is:

1. The process of stabilizing cellulose nitrate sheeting which comprises subjecting it to the action of a weak alcoholic solution of caustic alkali.

2. The process of stabilizing cellulose nitrate sheeting which comprises subjecting it to the action of a .1 to 1% solution of caustic alkali in alcohol.

3. The process of stabilizing cellulose nitrate sheeting which comprises subjecting it to the action of a .1 to 1% solution of caustic alkali in alcohol at approximately 115° to 120° F.

4. The process of stabilizing cellulose nitrate sheeting which comprises subjecting it to the action of a .1 to 1% solution of caustic alkali in alcohol at approximately 115° to 120° F. for about 30 minutes.

5. The process of stabilizing cellulose nitrate sheeting which comprises subjecting it to the action of a weak alcoholic solution of sodium hydroxide.

6. The process of stabilizing cellulose nitrate sheeting which comprises subjecting it to the action of a .1 to 1% solution of sodium hydroxide in alcohol.

7. The process of stabilizing cellulose nitrate sheeting which comprises subjecting it to the action of a .1 to 1% solution of sodium hydroxide in alcohol at approximately 115° to 120° F.

8. The process of stabilizing cellulose nitrate sheeting which comprises subjecting it to the action of a .1 to 1% solution of sodium hydroxide in alcohol at approximately 115° to 120° F. for about thirty minutes.

9. The process of stabilizing cellulose nitrate sheeting which comprises subjecting it to the action of approximately a .75% solution of sodium hydroxide in alcohol.

10. The process of stabilizing cellulose nitrate sheeting which comprises subjecting it to the action of approximately a .75% solution of sodium hydroxide in alcohol at approximately 115° to 120° F.

MARVIN J. REID.